(12) United States Patent
Tecu (10) Patent No.: US 9,535,913 B2
(45) Date of Patent: Jan. 3, 2017

(54) METHOD AND SYSTEM FOR FILE CONVERSION

(71) Applicant: Kirk Steven Tecu, Longmont, CO (US)

(72) Inventor: Kirk Steven Tecu, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 294 days.

(21) Appl. No.: 13/791,661

(22) Filed: Mar. 8, 2013

(65) Prior Publication Data

US 2014/0258258 A1    Sep. 11, 2014

(51) Int. Cl.
G06F 17/30    (2006.01)

(52) U.S. Cl.
CPC ....... *G06F 17/30076* (2013.01); *G06F 17/301* (2013.01); *G06F 17/30554* (2013.01); *G06F 17/30769* (2013.01); *G06F 17/30914* (2013.01)

(58) Field of Classification Search
CPC ...... G06F 17/24; G06F 3/1243; G06F 3/1245; G06F 17/20; G06F 17/218; G06F 17/30; G06F 17/30554; G06F 17/30817; G06F 17/30058; G06F 17/30271; G06F 17/30997; G06F 17/30011
USPC .......................... 707/705–780; 715/200–277
See application file for complete search history.

(56) References Cited

U.S. PATENT DOCUMENTS

| | | | |
|---|---|---|---|
| 7,313,754 B2 * | 12/2007 | McLure | G06F 17/2247 715/234 |
| 9,396,174 B1 * | 7/2016 | Alves | G06F 17/2247 |
| 2002/0016800 A1 | 2/2002 | Spivak et al. | |
| 2004/0199876 A1 * | 10/2004 | Ethier et al. | 715/523 |
| 2006/0085442 A1 | 4/2006 | Fujiwara | |
| 2006/0179405 A1 * | 8/2006 | Chao | G06F 17/248 715/209 |
| 2006/0224952 A1 * | 10/2006 | Lin | G06F 17/2247 715/209 |
| 2009/0019074 A1 * | 1/2009 | Hino | G06F 17/30271 |
| 2009/0037463 A1 * | 2/2009 | Terao | G06F 17/30011 |
| 2009/0292678 A1 * | 11/2009 | Kawanishi | 707/3 |
| 2009/0327873 A1 * | 12/2009 | Cairns | G06F 17/241 715/249 |
| 2010/0017705 A1 * | 1/2010 | Sato | H04N 1/00442 715/243 |

(Continued)

FOREIGN PATENT DOCUMENTS

| | | | |
|---|---|---|---|
| JP | 2006-285612 A | 10/2006 | |
| JP | 2011-141598 A | 7/2011 | |

OTHER PUBLICATIONS

Office Action issued in corresponding Japanese Application No. 2014-043565 dated Aug. 30, 2016, and English translation thereof (30 pages).

*Primary Examiner* — Michelle Owyang
(74) *Attorney, Agent, or Firm* — Osha Liang LLP (57) ABSTRACT

A method for file conversion includes obtaining an original file including content, that includes objects. The method further includes rendering each object of the multiple objects into a page description language (PDL) format to obtain rendered objects, and extracting, from the original file, a tag for an object of the multiple objects. The method further includes generating object composition metadata based on a composition rule corresponding to the tag. The object composition metadata includes a description of a composition of the object in the original file, and is added with the rendered objects to a PDL file.

17 Claims, 5 Drawing Sheets

(56) References Cited

U.S. PATENT DOCUMENTS

| | | | | |
|---|---|---|---|---|
| 2010/0202015 A1* | 8/2010 | Misawa | ............ | G06F 17/30253 358/1.15 |
| 2010/0214614 A1* | 8/2010 | Ferlitsch et al. | ............. | 358/1.18 |
| 2013/0174017 A1* | 7/2013 | Richardson et al. | ......... | 715/234 |

* cited by examiner

METHOD AND SYSTEM FOR FILE CONVERSION

BACKGROUND

Electronic documents are used by computing device users to store, share, archive, and search information. Such documents are stored, temporarily or permanently, in files. Many different file formats exist. Each file format defines how the content of the file is encoded. In other words, based on the file format, the content of the file may be read and displayed.

While many different file formats exist, page description languages (PDLs) file formats are common for sharing and archiving data. To generate a PDL file (i.e., a file in a PDL file format), a user will often first create the document in a different file format, such as the file format of a word processing program. Then the user converts the file having the document to the PDL file.

During the conversion process, the content corresponding to text may be maintained to allow string searches on the text in the new format. Further, file metadata may be generated to describe the file as a whole, such as authorship, creation time, edit time, and other such data describing the entire file. However, other information from the original file is not transferred in the conversion process and, therefore, not searchable.

SUMMARY

In general, in one aspect, embodiments relate to a method for file conversion. The method includes obtaining an original file including content, that includes objects. The method further includes rendering each object of the multiple objects into a page description language (PDL) format to obtain rendered objects, and extracting, from the original file, a tag for an object of the multiple objects. The method further includes generating object composition metadata based on a composition rule corresponding to the tag. The object composition metadata includes a description of a composition of the object in the original file, is added with the rendered objects to a PDL file, and is searchable in the PDL file.

In general, in one aspect, embodiments relate to a system for file conversion. The system includes a data repository that includes composition rules, a computer processor, a content converter, and a composition extractor. The content converter executes on the computer processor and is configured to obtain an original file comprising content that includes objects, render each of the objects into a page description language (PDL) format to obtain rendered objects, and add the rendered objects to a PDL file. The composition extractor executes on the computer processor and is configured to extract, from the original file, a tag for an object, retrieve, from the data repository, a composition rule corresponding to the tag, and generate object composition metadata based on the composition rule. The object composition metadata includes a description of a composition of the object in the original file. The object composition metadata is added to the PDL file and is searchable in the PDL file.

In general, in one aspect, embodiments relate to a non-transitory computer readable medium that includes computer readable program code. The computer readable program code is for obtaining an original file including content, that includes objects. The computer readable program code is further for rendering each object of the multiple objects into a page description language (PDL) format to obtain rendered objects, and extracting, from the original file, a tag for an object of the multiple objects. The computer readable program code is further for generating object composition metadata based on a composition rule corresponding to the tag. The object composition metadata includes a description of a composition of the object in the original file, is added with the rendered objects to a PDL file, and is searchable in the PDL file.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for file conversion. Specifically, in the conversion of an original file to a page description language (PDL) file, one or more embodiments of the invention add composition metadata about the content of the original file. The original file includes displayed objects corresponding to the content of the file. Tags from the original file are used to add object composition metadata to the PDL file.

Figure 1:
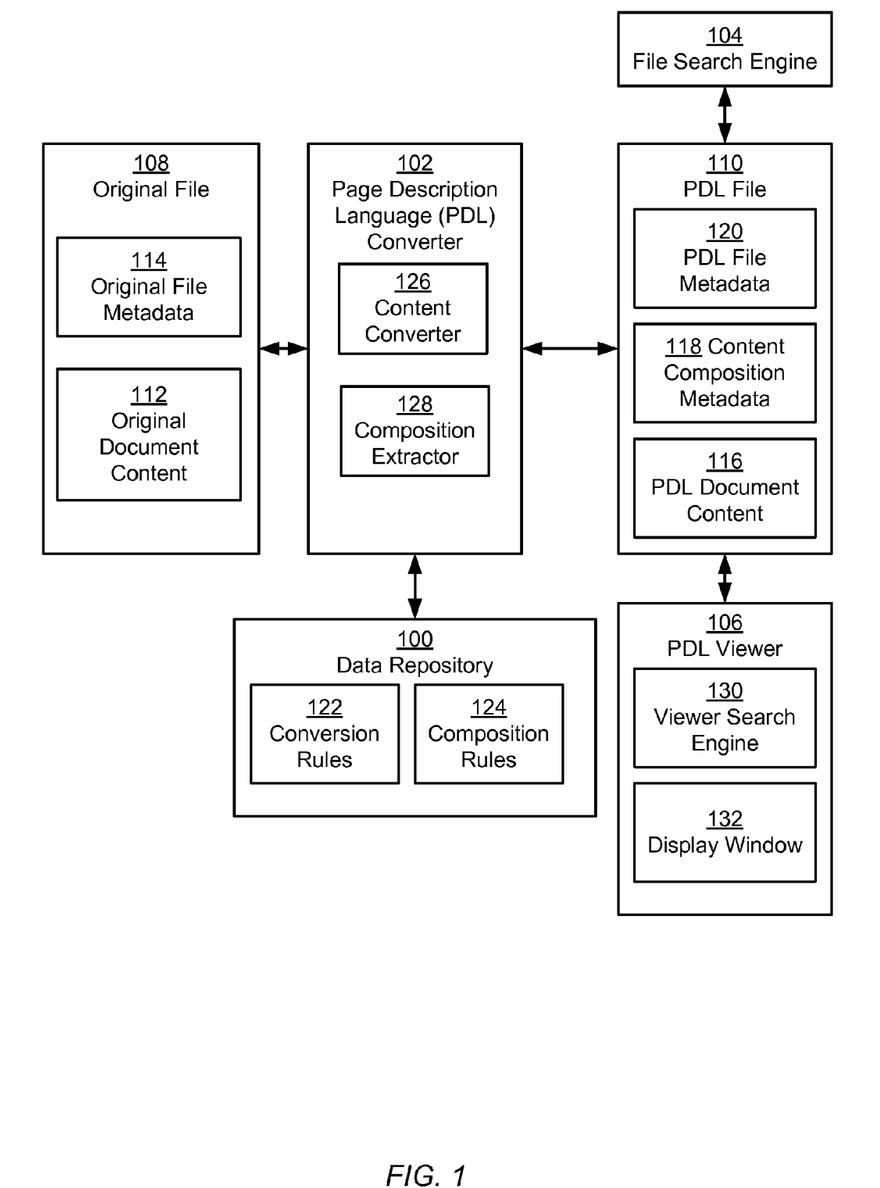
FIG. 1 shows a schematic diagram of a system in one or more embodiments of the invention.

FIG. 1 shows a schematic diagram of a system in one or more embodiments of the invention. As shown in FIG. 1, the system may include a PDL converter (102), a data repository (100), a PDL viewer (106), and a file search engine (104). An original file (108) and a PDL file (110) are also shown in FIG. 1. Each of the elements of FIG. 1 is discussed below.

An original file (108) is an input file to the conversion process. For example, the original file (108) may be in a word processor file format, a presentation file format, a spreadsheet file format, in hypertext markup language, or in another file format. The original file (108) may be temporarily or semi-permanently stored. For example, a user may or may not have saved the original file (108) after creating the original file and prior to conversion.

In one or more embodiments of the invention, the original file (108) includes original document content (112). The original document content (112) corresponds to the displayed data in the file. Specifically, the original document content (112) includes data that is displayed when a user views the original file using a program used to create the original file. The original document content (112) includes objects. Each object is text, a graphical image or other parts of the content that is displayable. Graphical images may include bitmap-based images and vector based graphical images. For example, a graphical image may be stylized text (e.g., word art), chart, pictorial image, or other graphics. Objects in the original document content (112) may be delimited by one or more hidden tags. The tags specify formatting and type information for one or more objects. Formatting describes how the object is displayed. Formatting may include color, size, shading, image file name (e.g., puppy.jpg), and other such information. Type refers to what the object is. For example, a type may be a particular kind of chart, word art, text, image, table, clipart, bulleted list, and other such types. In one or more embodiments of the invention, charts, word art, images, and clipart may be referred to as graphical types.

Continuing with the tags, by way of an example, a pie chart object (i.e., an object corresponding to a pie chart) may be delimited from the remainder of the original file by a hidden start tag and a hidden end tag that specify pie chart. Within the pie chart object may be tags defining the size of each slice in the pie chart and the color of the slice. A bar graph object may be delimited from the remainder of the original file by a hidden start tag and a hidden end tag that specify bar graph. Text may be delimited by tags specifying font size, font name, font color and other attributes of the text. Although FIG. 1 shows a single file, the file may be composed of multiple files. Each of the multiple files may include the encoding in the original file format for at least one of the objects.

In one or more embodiments of the invention, the original file (108) may also include original file metadata (114). Original file metadata (114) corresponds to data describing the whole file. For example, original file metadata (114) may include author, creation time, edit time, security parameters, subject, title, file name, and other data about the original file as a whole.

A PDL file (110) corresponds to a file that is in PDL format. A file is in PDL format when the file is written in a PDL. In one or more embodiments of the invention, a PDL provides explicit or very simply derived, positioning details (i.e., coordinates) for one or more objects (e.g., text characters, symbols, graphical objects including images, photographs, clipart, etc.) in the file content. Further, a PDL may identify the page breaks between file content. Example PDLs include, but are not limited to, device independent file format (DVI), portable document format (PDF), PostScript®, and XPS (XML Paper Specification). PostScript® is a registered trademark of Adobe Systems Incorporated, located in San Jose, Calif.

The PDL file (110) includes PDL document content (116), content composition metadata (118), and PDL file metadata (120). PDL document content (116) corresponds to a translation of the original document content (112). At least a portion of the composition of the original file is not rendered in the translation. In other words, the tags in the original file (108) may be excluded from delimiting the objects in the PDL document content (116) (i.e., one or more tags are effectively lost in the conversion process). The removal of the tags removes explicit associations between the object and the type of object and formatting. For example, if the original document content (112) includes a word art object and/or a chart object, the PDL document content (116) includes the word art object and/or chart object translated into an image. Objects in the PDL document content (116) that are rendered as images are indistinguishable from each other in the PDL format. In one or more embodiments of the invention, the PDL document content (116) includes all information for identically displaying the objects on the screen that are included in the original file (108).

Content composition metadata (118) is metadata describing how objects are composed in the original document content (112). Specifically, the content composition metadata (118) includes, for at least one object in the PDL document content, object composition metadata. Object composition metadata includes a description of the composition of the object in the original file. Specifically, the description specifies, for a particular object, the type of object and formatting for the object. Object composition metadata (118) may further include the location of the object. The location of each object may be specified, for example, by page number of the page in which the object is located and x and y coordinates on the page. In one or more embodiments of the invention, the content composition metadata (118) is not used to render the PDL file for display. In such embodiments, the content composition metadata (118) is for informational purposes. In other words, the content composition metadata (118) may be used exclusively for informational purposes, such as exclusively for searching in one or more embodiments of the invention. Although FIG. 1 shows the content composition metadata (118) as separate from the PDL document content (116), the content composition metadata (118) may be embedded in the PDL document content (116).

In contrast to the content composition metadata (118), PDL file metadata (120) is data about the PDL file (110) as a whole. Specifically, PDL file metadata (120) does not provide information about individual objects in the PDL document content (116), but rather provides information about the entire PDL file (110). For example, PDL file metadata (120) may include a file name, a file creation date, a file edit data, a title for the PDL document content (116), author, security tracking information, and other information about the PDL file (110).

Continuing with FIG. 1, in one or more embodiments of the invention, the data repository (100) is any type of storage unit and/or device (e.g., a file system, database, collection of tables, or any other storage mechanism) for storing data. Further, the data repository (100) may include multiple different storage units and/or devices. The multiple different storage units and/or devices may or may not be of the same type or located at the same physical site. The data repository (100) may include functionality to store conversion rules (122) and composition rules (124) in one or more embodiments of the invention.

Conversion rules (122) specify, for each type of object, the PDL format to render object in the PDL document content (116). Specifically, the conversion rule (122) may specify how to translate the original object into a PDL object. For example, a conversion rule may specify to create a bitmap image from a chart or word art.

Composition rules (124) specify the object composition metadata to add to the content composition metadata (118). In one or more embodiments of the invention, an individual composition rule exists for one or more tags delimiting an object. The composition rule (124) relates the one or more tags with a description. The description in the rule and, subsequently, in the object composition metadata may include variations of terms in the description. In one or more embodiments of the invention, the variations may be variations in spelling, synonyms, and other variations. For example, "pie chart" in the description may also have "pi chart," "chart," and "circle chart" in the description.

Continuing with FIG. 1, a PDL converter (102) corresponds to a software tool that includes functionality to convert the original file (108) into a PDL file (110). The PDL converter (102) includes a content converter (126) and a composition extractor. The content converter (126) includes functionality to generate PDL document content (116) from original document content (112). In one or more embodiments of the invention, the content converter is operatively connected to the conversion rules (122) and includes functionality to perform the conversion using the conversion rules.

In one or more embodiments of the invention, the composition extractor (128) includes functionality to generate the content composition metadata (118) from the original document content (112). Specifically, the composition extractor (128) is operatively connected to the composition rules (124). The composition extractor (128) includes functionality to obtain one or more tags from the original document content (112), determine whether the one or more tags match a composition rule, and generate object composition metadata when the one or more tags match.

Continuing with FIG. 1, a file search engine (104) includes functionality to receive a search request specifying particular properties. The properties may include a description in content composition metadata (118), one or more portions of the file metadata (e.g., original file metadata (114), PDL file metadata (120)), one or more objects in content, or a combination thereof. The file search engine (104) may further include functionality to identify and return one or more files that have the particular properties in the search request. In one or more embodiments of the invention, the file search engine (104) is a tool provided by an operating system.

In one or more embodiments of the invention, a PDL viewer (106) includes functionality to display PDL files (110). Specifically, the PDL viewer (106) may include functionality to read the PDL file (110) and display the PDL file (110) in the display window (132). The PDL viewer (106) includes a PDL viewer search engine (130). The PDL viewer search engine (130) includes functionality to receive a search request for a currently displayed PDL file. The search request includes particular properties. The properties may include a description or portion thereof in content composition metadata, one or more objects in content, or a combination thereof. The viewer search engine (130) may further include functionality to identify if an object has the properties in the search request and display the portion of the PDL file having the object in the display window (132). The identified object may be shown as highlighted in the display window (132).

In one or more embodiments of the invention, the PDL viewer search engine and/or the file search engine may be standard tools. In such embodiments, the content composition metadata may be invisible or hidden strings that overlay or are in proximity to the objects. In other words, in such embodiments, the content composition metadata may be a part of the PDL document content that is not visible to the user when viewing the PDL file.

While FIG. 1 shows a configuration of components, other configurations may be used without departing from the scope of the invention. For example, various components may be combined to create a single component. Specifically, the composition rules (124) may be a part of the composition extractor (128) without departing from the scope of the invention. As another example, the functionality performed by a single component may be performed by two or more components.

Figure 2:
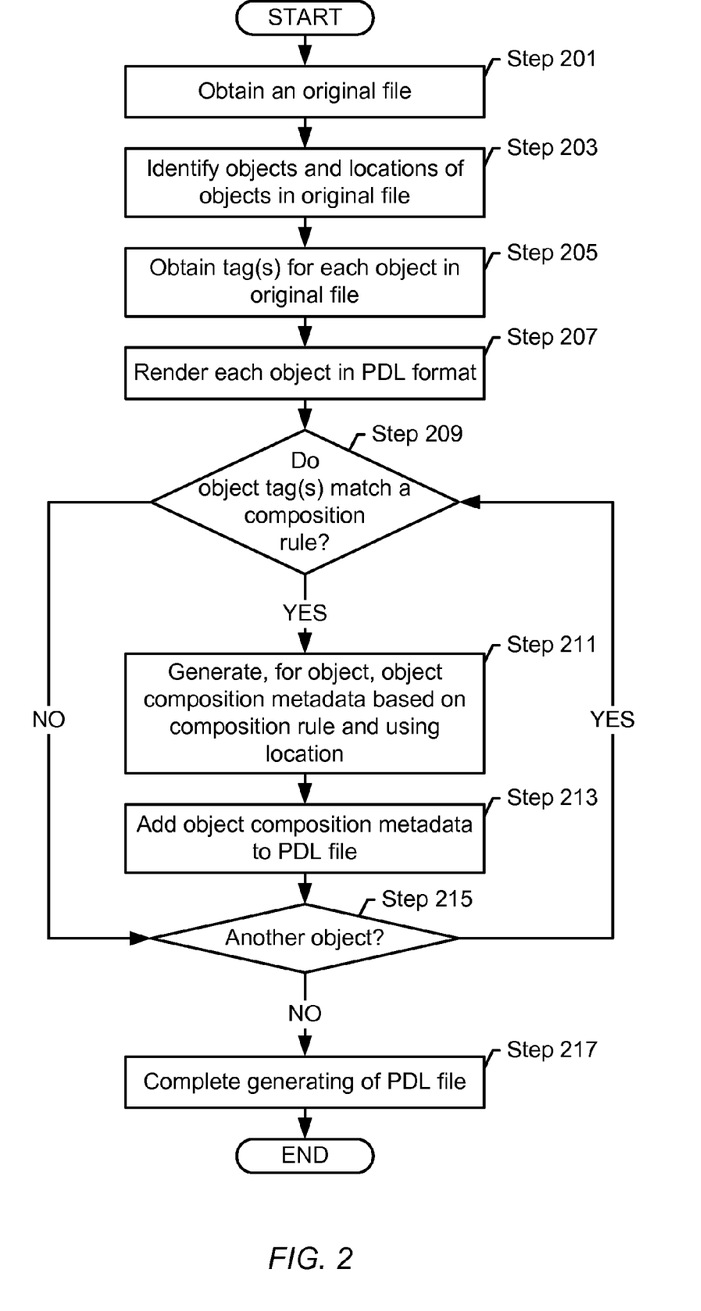
FIGS. 2, 3A, and 3B show flowcharts in one or more embodiments of the invention.
Figure 3A:
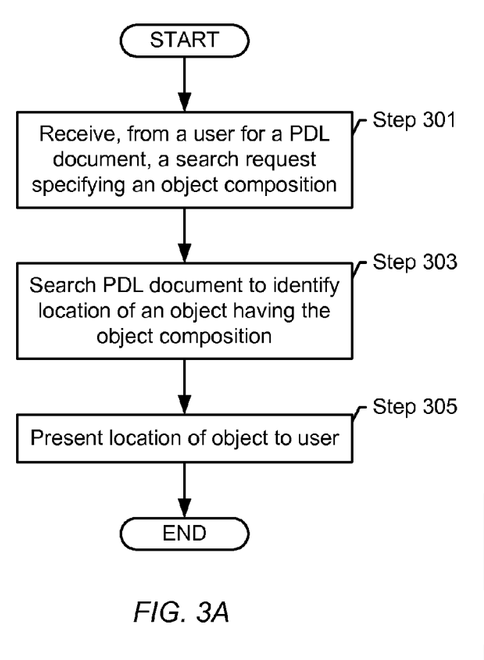
Figure 3B:
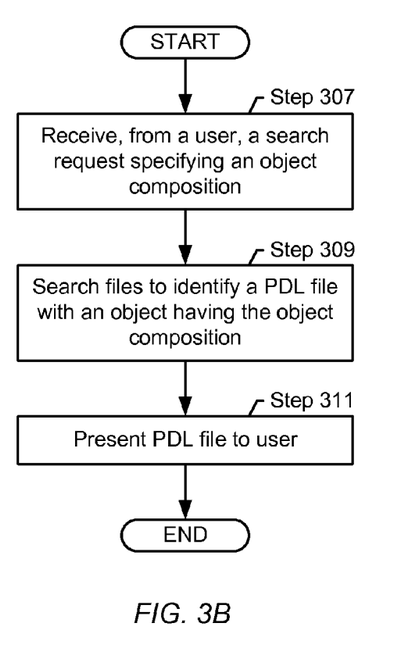

FIGS. 2, 3A, and 3B show flowcharts in one or more embodiments of the invention. While the various steps in these flowcharts are presented and described sequentially, some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for generating a PDL file in one or more embodiments of the invention. In Step 201, an original file is obtained. Specifically, a user may initiate a PDL converter with an identifier of the original file. For example, the original file may be opened using a program that interprets and displays the original file and the user may request that the opened file be converted to a PDL. By way of another example, the user may select the original file and request, through an operating system interface, that the file be converted to a PDL. In some embodiments, the user may request or have a default parameter set to store content composition metadata. In some alternative embodiments, content composition metadata is always stored. As used herein, a user requests conversion when the user directly or indirectly (e.g., through a script) initiates conversion. Once the user requests the conversion, the original file is passed to the converter.

In Step 203, objects and locations of objects are identified in the original file in one or more embodiments of the invention. Standard techniques may be used to identify objects and locations of objects. For example, identifying objects and the locations of the objects may be performed by parsing the original file and extracting objects delimited by tags.

In Step 205, tags for each object are obtained in the original file in one or more embodiments of the invention. Specifically, the set of one or more tags corresponding to an object are related to the object in a temporary data structure. In one or more embodiments of the invention, the set of one or more tags are identified based on the object being between a start tag and an end tag of the same type.

In Step 207, each object is rendered in PDL format in one or more embodiments of the invention. Rendering each object includes translating the object to PDL format. For example, charts, graphs, and other such objects may be converted into images. By converting such objects to images, proprietary software may not be required to view such objects. The rendered object is added to the PDL file. Further, some of the data in the tags may be effectively lost during the conversion process of the original file. However, such data may be maintained through the object composition metadata.

In Step 209, a determination is made whether one or more tags for an object match a composition rule. Specifically, the set of tags corresponding to the object is compared to with each rule in the composition rules. If the composition rule includes the tags corresponding to the object, or a subset thereof, then a match is determined to be found. If a match is not found, then the flow proceeds to Step 215 to determine whether another unanalyzed object exists.

If a match is found, in Step 211, object composition metadata is generated for the object based on the matching composition rule and using the location in one or more embodiments of the invention. In particular, the description in the matching composition rule is obtained from the matching composition rule. In one or more embodiments of the invention, the description has individual words in a human language (as opposed to computer languages). Thus, the description may be searched using human language based search strings. The description is added to the object composition metadata. Further, the location obtained in Step 203 may be added to the object composition metadata and related to the description.

In Step 213, object composition metadata is added to the PDL file. In one or more embodiments of the invention, the object composition metadata is stored in a separate part of the PDL file having the content composition metadata. In one or more embodiments, the object composition metadata is embedded in the PDL file with the object. In other words, the object composition metadata may be added to the PDL file next to (or above/below) the object in the PDL file. The object composition metadata may be added such that the object composition metadata is not interpreted by the viewer when displaying the PDL document content. In one or more embodiments of the invention, the object composition metadata may be added as hidden content to the PDL file. Hidden content corresponds to document content that is not displayed.

Although Step 211 and 213 disclose a single matching rule, multiple matching rules may be associated with the same object. In such embodiments, descriptions for each matching rule may be added to the object composition metadata.

In Step 215, a determination is made whether another unanalyzed object exists. In particular, each object is analyzed to determine whether one or more rules match the object. If a determination is made that another unanalyzed object exists, then the method repeats with Step 209 to analyze the next object. If another unanalyzed object does not exist, then generation of the PDL file is completed in Step 217. Once completed, the PDL file may be viewed and searched.

In the flowchart explained above, the PDL file is once generated, and the object composition meta data is added to such generated PDL file. However, the present invention is not limited to this specific implementation. For instance, the generation of the PDL file can be deferred until the Step 217 is executed. In this case, the rendered objects and the object composition metadata are once stored in memory areas, and then are compiled into the PDL file format.

FIG. 3A shows a flowchart for searching in a PDL file for an object having a particular composition. A search request and find request are the same as used herein and refer to any string query in one or more files for one or more matches to the string in the query.

In Step 301, a search request specifying an object composition is received from a user for a PDL document. In one or more embodiments of the invention, a user may open the PDL document in the PDL viewer. The user may open a search dialog box in the PDL viewer and type in a search string specifying an object composition. For example, if the user is searching for word art but does not remember any particular word in the word art, the user may enter "word art" in the search dialog box. In one or more embodiments of the invention, the content composition metadata is added to the PDL file such that existing (e.g., legacy) search engines may search the content composition metadata.

In Step 303, the PDL document is searched to identify the location of an object having the object composition. In one or more embodiments of the invention, the viewer search engine searches through the content composition metadata to identify the description that matches the search string. In performing the search, the viewer search engine may search the entire PDL file, including the PDL document content. Alternatively, the viewer search engine may just search the content composition metadata. In one or more embodiments of the invention, when a match is found, the PDL viewer obtains the location. The location may be explicitly specified in the object composition metadata or identified based on the location of the object composition metadata.

In Step 305, the location of the object is presented to the user in one or more embodiments of the invention. Presenting the location may include highlighting the object corresponding to the matching object composition metadata and/or listing the location by page and position on the page. Alternatively or additionally, presenting the location may include centering the current display on the object. Other techniques for listing the location may be used without departing from the scope of the claims.

FIG. 3B shows a flowchart for searching for a document having an object with a specified composition. In Step 307, a search request specifying an object composition is received from a user in one or more embodiments of the invention. For example, the user may open a file search engine dialog box in the operating system. Using the file search engine, the user may specify optional parameters (e.g., components of file metadata) and a search string specifying object composition. Entering the search string may be performed as discussed above in Step 301.

In Step 309, files are searched to identify a PDL file with the object composition in one or more embodiments of the invention. In particular, each file is searched by the file search engine to identify the file that matches the optional parameters and has an object with the object composition. Searching for a matching object composition may be performed as discussed above.

In Step 311, the PDL file is presented to the user in one or more embodiments of the invention. Specifically, when a match is found, the matching PDL file or a link to the matching PDL file may be displayed for the user.

As shown by FIGS. 3A and 3B, embodiments allow for searching a PDL file not only for the document content, but also for how the document content is composed in the original file. Thus, if a user remembers the composition and not particular text, the user may still be able to file the PDL file or object matching the composition.

Figure 4:
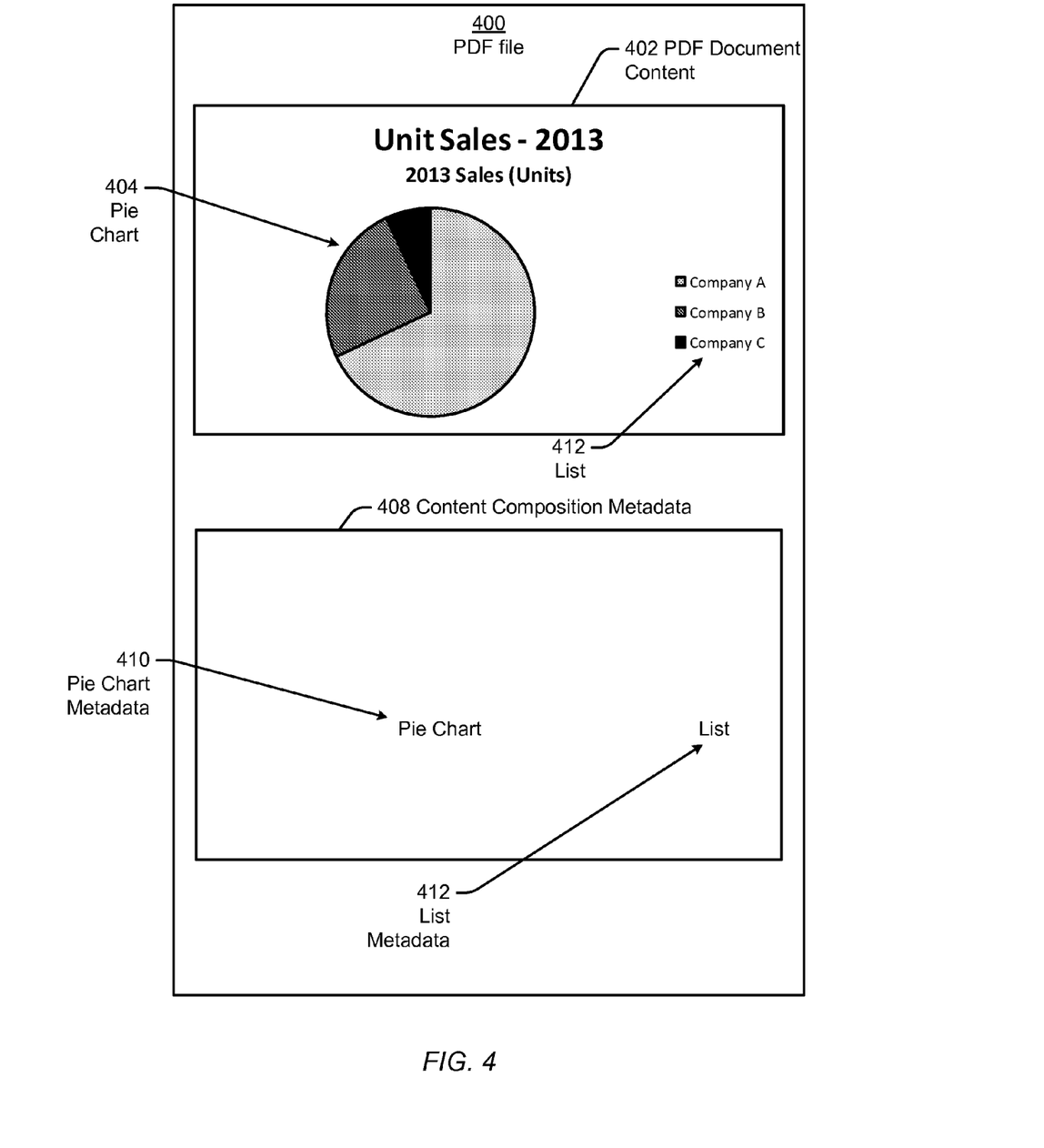
FIG. 4 shows an example in one or more embodiments of the invention.

FIG. 4 shows an example in one or more embodiments of the invention. The following example is for explanatory purposes only and not intended to limit the scope of the invention. Consider the scenario in which a user creates a presentation file with a slide that includes a pie chart. The user may create the presentation file, for example, using Microsoft® PowerPoint® 2007. (PowerPoint is a registered trademark of Microsoft Corporation, located in Redmond, Wash.). In the example in which the user creates the file using Microsoft® PowerPoint® 2007, the presentation file is an OOXML format.

Next, the user wants to distribute the presentation to other users that may not have Microsoft® PowerPoint® 2007. Accordingly, the user requests a PDF converter to convert the presentation file to PDF format. The PDF converter not only renders and assembles standard object content into the PDF file, but also mines the objects' tag data and applies object composition metadata as an invisible string on top of the objects as follows.

Because of the PDF converter's knowledge of the OOXML specification, the PDF converter finds the tag "<c:pieChart>" in the OOXML file in ppt/charts/_rels/ chart1.xml, and extracts the tag. The PDF converter further creates a search friendly string of "pie chart", and applies the search friendly string as invisible text over the center position of the pie chart rendered in the visible layer (this is just an example of a possible logic/rule in the conversion tool). The PDF content and content composition metadata are assembled and saved to PDF.

FIG. 4 shows the example resulting PDF file (400) in one or more embodiments of the invention. As shown, the PDF document content (402) includes the pie chart (404) generated by the user and a corresponding list (412). The pie chart (404) when rendered in the PDF document content (402) is an image and the list (406) is text. Content composition metadata (408) is generated when the PDF file (400) is created. The content composition metadata (408) is an invisible layer over the PDF document content (402). In FIG. 4, the content composition metadata (408) is shown separate for clarity purposes. As shown in FIG. 4, the content composition metadata (408) includes pie chart metadata (410) with the description "Pie Chart" over the pie chart (404) in the PDF document content (402). The content composition metadata (408) may further include list metadata (412) with the description "List" over the list (412) in the PDF document content (402).

Continuing with the example, the user distributes and archives the PDF file (400). Later, the user wants to retrieve the document for review. However, the user cannot remember the title of the pie chart "Unit Sales—2013". Because of the composition extractor and the storing of the content composition metadata, the user can search for a "high-level" property of the document (e.g., "Pie Chart" or "pie chart" if a non-case sensitive search engine is used) and successfully find the PDF file (400) having pie chart (404), even though the string, "pie chart," is not visible in the PDF.

Figure 5:
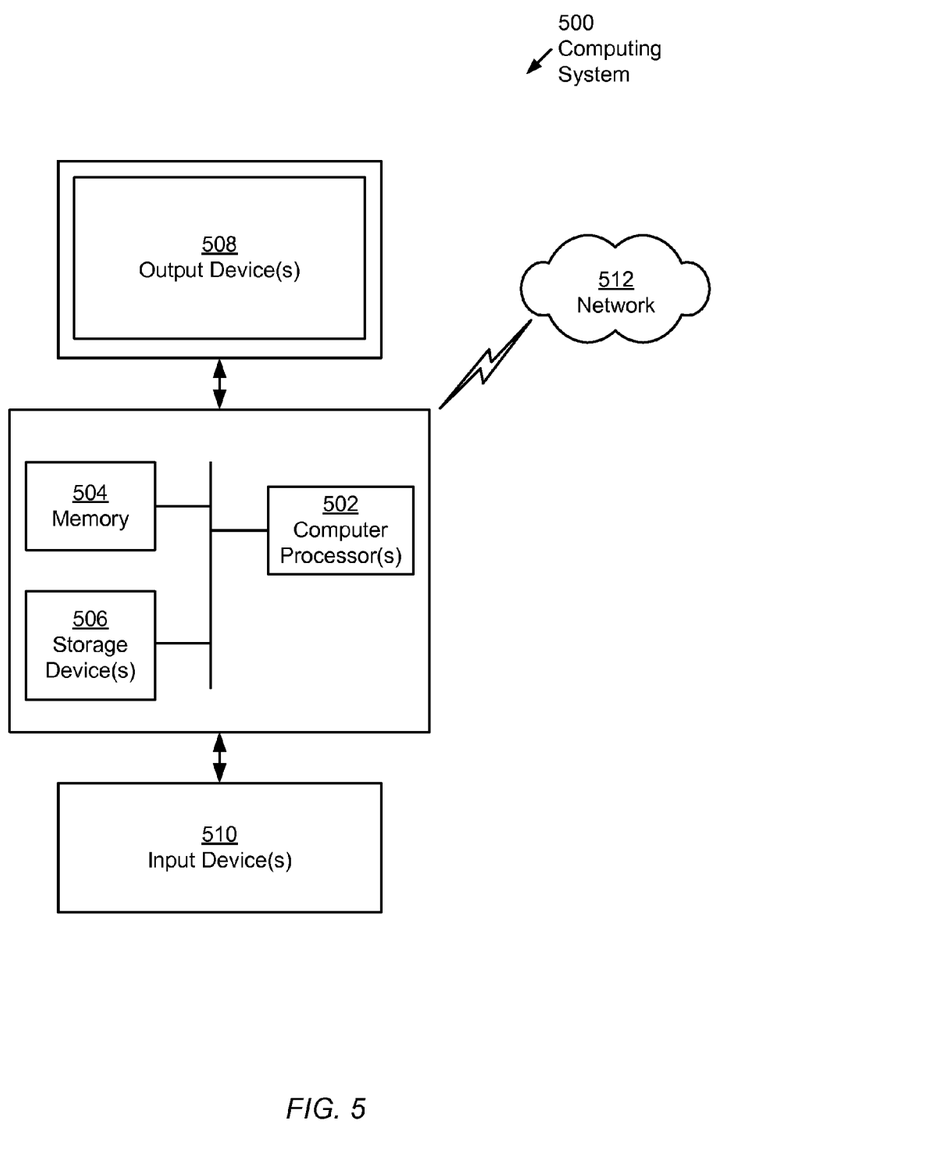
FIG. 5 shows a computing system in one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same as or different from the input device(s). The computing system (500) may be connected to a network (514) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (514). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for file conversion from an original file to a page description language (PDL) file, comprising:
   obtaining the original file comprising a graphics object delimited by a tag, wherein the tag in the original file specifies a type of the graphics object and a formatting attribute of the graphics object;
   translating the graphics object into an image based on the type and formatting attribute in the tag;
   generating object composition metadata for the graphics object based on a composition rule corresponding to the tag, wherein the object composition metadata comprises a description of the graphics object in the original file;
   adding the image to a visible layer of the PDL file;
   adding the object composition metadata for the graphics object to an invisible layer of the PDL file,
   wherein the image in the visible layer and the description in the invisible layer overlap,
   wherein the object composition metadata is searchable in the PDL file but is not visible when the PDL file is displayed, and
   wherein the PDL file does not have the tag;
   receiving a search request specifying the description of the graphics object;
   identifying, in response to the search request, a location of the description in the invisible layer of the PDL file; and displaying a portion of the visible layer comprising the image in response to the portion of the visible layer overlapping the location.

2. The method of claim 1, wherein the PDL file is generated prior to generating the object composition metadata.

3. The method of claim 1, wherein the PDL file is generated after generating the object composition metadata.

4. The method of claim 1, wherein the description in the object composition metadata comprises the type of the graphics object, wherein the type of the graphics object is extracted from the tag.

5. The method of claim 1, wherein the invisible layer comprising the object composition metadata is above the visible layer comprising the image.

6. The method of claim 1, further comprising:
receiving a search request comprising the description of the graphics object;
searching, in a plurality of PDL files comprising the PDL file, for the object composition metadata comprising the description specified in the search request; and
returning an identifier of the PDL file in response to the PDL file comprising the object composition metadata comprising the description.

7. The method of claim 1, wherein the object composition metadata comprises plurality of synonyms for the description.

8. A system for file conversion from an original file to a page description language (PDL) file, comprising:
a data repository comprising a plurality of composition rules;
a computer processor;
a content converter executing on the computer processor that:
obtains the original file comprising a graphics object delimited by a tag, wherein the tag in the original file specifies a type of the graphics object and a formatting attribute of the graphics object;
translates the graphics object into an image based on the type and formatting attribute in the tag; and
adds the the image to a visible layer of the PDL file;
a composition extractor executing on the computer processor that:
retrieves, from the data repository, a composition rule corresponding to the tag;
generates object composition metadata for the graphics object based on the composition rule, wherein the object composition metadata comprises a description of the graphics object based on the type and formatting attribute in the tag; and
adds, for the graphics object, the object composition metadata comprising the description to an invisible layer of the PDL file,
wherein the image in the visible layer and the description in the invisible layer overlap,
wherein the object composition metadata is searchable in the PDL file but is not visible when the PDL file is displayed, and
wherein the PDL file does not have the tag; and
a PDL viewer executing on the computer processor and comprising:
a viewer search engine that:
receives a search request specifying the description of the graphics object; and
identifies, in response to the search request, a location of the description in the invisible layer of the PDL file; and a display window that displays a portion of the visible layer comprising the image in response to the portion of the visible layer overlapping the location.

9. The system of claim 8, wherein the description in the object composition metadata comprises the type of the graphics object, wherein the type of the graphics object is extracted from the tag.

10. The system of claim 8, wherein the PDL file is generated after generating the object composition metadata.

11. The system of claim 8, wherein the invisible layer comprising the object composition metadata is located above the visible layer comprising the image in.

12. The system of claim 8, further comprising:
a file search engine configured to:
receive a search request specifying the description of graphics object;
search, in a plurality of PDL files comprising the PDL file, for the object composition metadata comprising the description specified in the search request; and
return an identifier of the PDL file in response to the PDL file comprising the object composition metadata comprising the description.

13. A non-transitory computer readable medium comprising computer readable program code embodied therein for converting an original file to a page description language (PDL) format, the computer readable program code:
obtains an original file comprising a graphics object delimited by a tag, wherein the tag specifies a type of the graphics object and a formatting attribute of the graphics object;
translates the graphics object in the original file into an image based on the type and formatting attribute in the tag;
generates object composition metadata for the graphics object based on a composition rule corresponding to the tag, wherein the object composition metadata comprises a description of the graphics object in the original file;
adds the image to a visible layer of the PDL file;
adds the object composition metadata comprising the description to an invisible layer of PDL file,
wherein the image in the visible layer and the description in the invisible layer overlap,
wherein the object composition metadata is searchable in the PDL file but is not visible when the PDL file is displayed, and
wherein the PDL file does not have the tag;
receives a search request specifying the description of the graphics object;
identifies, in response to the search request, a location of the description in the invisible layer of the PDL file; and
displays a portion of the visible layer comprising the image in response to the portion of the visible layer overlapping the location.

14. The non-transitory computer readable medium of claim 13, wherein the description in the object composition metadata comprises the type of the graphics object, wherein the type of the graphics object is extracted from the tag.

15. The non-transitory computer readable medium of claim 13, wherein the PDL file is generated after generating the object composition metadata.

16. The non-transitory computer readable medium of claim 13, wherein the invisible layer comprising the object composition metadata is above the visible layer comprising the image.

17. The non-transitory computer readable medium of claim 13, further comprising computer readable program code that:
   receives a search request specifying the description of the graphics object;
   searches, in a plurality of PDL files comprising the PDL file, for the object composition metadata comprising the description specified in the search request; and
   returns an identifier of the PDL file in response to the PDL file comprising the object composition metadata comprising the description specified in the search request.

* * * * *

UNITED STATES PATENT AND TRADEMARK OFFICE
CERTIFICATE OF CORRECTION

PATENT NO.       : 9,535,913 B2
APPLICATION NO.  : 13/791661
DATED            : January 3, 2017
INVENTOR(S)      : Kirk Steven Tecu Page 1 of 1

It is certified that error appears in the above-identified patent and that said Letters Patent is hereby corrected as shown below:

In the Claims

At Claim 8, Line 41, the words "adds the the image" should read -- adds the image --.

At Claim 11, Line 12, the words "comprising the image in." should read -- comprising the image. --.

A Claim 13, Line 42, the words "layer of PDL file" should read -- layer of the PDL file --.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*